United States Patent
Liu

(10) Patent No.: US 9,158,922 B2
(45) Date of Patent: Oct. 13, 2015

(54) METHOD, SYSTEM, AND COMPUTER-READABLE MEDIUM FOR AUTOMATICALLY MITIGATING VULNERABILITIES IN SOURCE CODE

(71) Applicant: Lucent Sky Corporation, Pasadena, CA (US)

(72) Inventor: Jim Liu, Taipei (TW)

(73) Assignee: Lucent Sky Corporation, Pasadena, CA (US)

( * ) Notice: Subject to any disclaimer, the term of this patent is extended or adjusted under 35 U.S.C. 154(b) by 177 days.

(21) Appl. No.: 13/905,096

(22) Filed: May 29, 2013

(65) Prior Publication Data

US 2014/0359776 A1    Dec. 4, 2014

(51) Int. Cl.
*G06F 21/57* (2013.01)
*G06F 9/45* (2006.01)
*G06F 21/53* (2013.01)

(52) U.S. Cl.
CPC ............... *G06F 21/577* (2013.01); *G06F 8/41* (2013.01); *G06F 21/53* (2013.01)

(58) Field of Classification Search
CPC ............ G06F 11/3612; G06F 11/3466; G06F 11/3672; G06F 21/577; G06F 8/41; G06F 8/433; G06F 9/45516; H01L 63/14
See application file for complete search history.

(56) References Cited

U.S. PATENT DOCUMENTS

| | | | |
|---|---|---|---|
| 7,207,065 B2 | 4/2007 | Chess et al. | |
| 8,209,646 B2 | 6/2012 | Chess et al. | |
| 2010/0083240 A1 | 4/2010 | Siman | |
| 2012/0266247 A1 | 10/2012 | Guy et al. | |
| 2013/0179978 A1* | 7/2013 | Pistoia et al. | 726/25 |
| 2014/0173743 A1* | 6/2014 | Gluck et al. | 726/25 |

FOREIGN PATENT DOCUMENTS

| | | |
|---|---|---|
| EP | 1982270 | 10/2008 |
| EP | 1627303 | 1/2009 |
| EP | 2092424 | 8/2009 |

* cited by examiner

*Primary Examiner* — Eleni Shiferaw
*Assistant Examiner* — Paul Callahan
(74) *Attorney, Agent, or Firm* — Jianq Chyun IP Office

(57) ABSTRACT

A method for automatically mitigating vulnerabilities in a source code of an application is provided in the present invention. The method includes the following steps. First, the source code is complied, and a path graph is built according to the compiled source code. The path graph includes a plurality of paths traversing from sources to sinks, and each of the paths includes a plurality of nodes. Then, at least one tainted path is identified by enabling a plurality of vulnerability rules. Each of the at least one tainted path corresponds to a vulnerability, and each of the at least one vulnerability corresponds to a sanitization method. Then, the at least one vulnerability is determined if it is mitigable. If the at least one vulnerability is mitigable, the at least one vulnerability is mitigated automatically. Furthermore, the method may be implemented as a system and a computer program product.

17 Claims, 4 Drawing Sheets

METHOD, SYSTEM, AND COMPUTER-READABLE MEDIUM FOR AUTOMATICALLY MITIGATING VULNERABILITIES IN SOURCE CODE

TECHNICAL FIELD

The present invention relates to software security vulnerabilities. More particularly, the present invention relates to comprehensive techniques for automatically mitigating software security vulnerabilities in source code.

BACKGROUND

Businesses rely more and more on the cloud to keep their applications running and data accessible. However, a high percentage of websites have vulnerabilities that may lead to the theft of data such as credit card information and customer lists. Business needs application security solutions to avoid business interruptions and costly lawsuits. The software developers have historically focused on security vulnerabilities and other serious functionality issues in the software that may be exploited by hackers. Despite the efforts, the security vulnerabilities remain as serious threats in the application level.

Various methods have been developed to identify security vulnerabilities in applications, such as black-box testing and static code analysis. Static code analysis is used by the software developers to analyze software for problems and inconsistencies before actually compiling the source code and executing programs built from the code for the software, and such technique is aimed at locating and describing areas of security vulnerabilities in the source code. Most high-level optimizations performed by a modern compiler involve static analysis such as code path analysis, which is used to detect the propagation of an object and further validate the legality along a code execution path. Static code analysis is differentiated from dynamic analysis techniques by analyzing the source code for dependencies without relying on dynamic events in a more complete view of every possible execution path rather than some aspects of a necessarily limited observed behavior.

Several existing static code analysis tools are capable of scanning the source code by leveraging predefined security rules such that potential vulnerabilities are detected and reported to the software developers. The vulnerability report may be accompanied by generic remediation criteria, which proposes ways in which the software developers can amend the source code so as to mitigate the reported vulnerabilities. Nonetheless, the software developers still need to implement and validate the problematic source code manually, which may be labor-intensive in consideration of a large amount of existing applications. Due to lack of time or resources, many stakeholders are forced to deploy the applications even knowing they have potential security issues.

SUMMARY

The present invention provides a method, a system and a computer program product, which are capable of effectively mitigating vulnerabilities in a source code.

An exemplary embodiment of the present invention provides a method for automatically mitigating vulnerabilities in a source code of an application. The method includes the following steps. First, the source code is complied, and a path graph is built according to the compiled source code. The path graph includes a plurality of paths traversing from sources to sinks, and each of the paths includes a plurality of nodes. Then, at least one tainted path is identified by enabling a plurality of vulnerability rules. Each of the at least one tainted path corresponds to a vulnerability, and each of the at least one vulnerability corresponds to a sanitization method.

According to one of exemplary embodiments, the step of determining if the at least one vulnerability is mitigable is included as follows. A first forward node containing a tainted object is located as a target node along each of the at least one tainted path from the source to the sink.

According to one of exemplary embodiments, the step of determining if the at least one vulnerability is mitigable is included as follows. A first backward node containing the tainted object is located as the target node along each of the at least one tainted path from the sink to the source.

According to one of exemplary embodiments, the step of determining if the at least one vulnerability is mitigable further includes the following steps. The type of the at least one vulnerability is determined. If the at least one vulnerability is one of a structured query language (SQL) injection, an operating system (OS) command injection, a lightweight directory access protocol (LDAP) injection, an extensible markup language (XML) injection, or an XML path language (XPath) injection, the node containing the tainted object is located as the target node along each of the at least one tainted path from the source to the sink. If the at least one vulnerability is not any of the SQL injection, the OS command injection, the LDAP injection, the XML injection, or the XPath injection, the node containing the tainted object is located as the target node along each of the at least one tainted path from the sink to the source. Then, an actual object/variable is determined if it exists in the target node. If the actual object/variable exists, the at least one vulnerability is determined to be mitigatble. If the actual object/variable does not exist, a next node is set as the target node.

According to one of exemplary embodiments, the step of mitigating the determined at least one vulnerability automatically is included as follows. An instant-fix call is applied at the tainted object on the target node.

According to one of exemplary embodiments, after the step of applying the instant-fix call at the tainted object on the target node, the method further includes the following steps. A copy of amended source code is created according to the instant-fix call. The copy of amended source code is checked if it is legal. If the copy of amended source code is legal, the target node is written into a database. If the copy of amended source code is not legal, the next node is set as the target node.

According to one of exemplary embodiments, the step of determining if the at least one vulnerability is mitigable is included as follows. At least one other tainted path with the same target node is identified. The same target node is determined if it corresponds to different vulnerabilities. If the same target node does not correspond to different vulnerabilities, the at least one other tainted path is removed. If the same target node corresponds to different vulnerabilities, a priority order of the vulnerabilities is evaluated.

According to one of exemplary embodiments, the step of mitigating the determined at least one vulnerability automatically is included as follows. A plurality of instant-fix calls is applied at the tainted object on the target node according to the priority order. A confidence score corresponding to the instant-fix call is checked. The target node is written into a database.

According to one of exemplary embodiments, the method further includes the following step. The confidence score is lowered if the tainted object includes certain known functions.

According to one of exemplary embodiments, the method further includes the following step. The at least one vulnerability is determined if it is one of the SQL injection, the OS command injection, the LDAP injection, the XML injection, or the XPath injection. If the at least one vulnerability is one of the SQL injection, the OS command injection, the LDAP injection, the XML injection, or the XPath injection, the confidence score is lowered if the tainted object includes certain string constants.

According to one of exemplary embodiments, after the step of mitigating the determined at least one vulnerability automatically, the method further includes the following steps. A copy of amended source code is created according to the instant-fix calls. The copy of amended source code is compiled and determined if there exists any compiler error. The actual tainted object on the mitigable node corresponding to each of the compiler errors is located and the corresponding confidence score is set to zero.

An exemplary embodiment of the present invention provides a system for automatically mitigating vulnerabilities in a source code of an application is provided in the present invention. The system includes a memory, a database, a processor. The processor is coupled to the memory and the database, wherein the processor performs an operation for automatically mitigating vulnerabilities in the source code of the application, wherein the operation includes the following steps. First, the source code is complied, and a path graph is built according to the compiled source code. The path graph includes a plurality of paths traversing from sources to sinks, and each of the paths includes a plurality of nodes. Then, at least one tainted path is identified by enabling a plurality of vulnerability rules. Each of the at least one tainted path corresponds to a vulnerability, and each of the at least one vulnerability corresponds to a sanitization method.

According to one of exemplary embodiments, the processor locates a node containing a tainted object as a target node along each of the at least one tainted path from the source to the sink.

According to one of exemplary embodiments, the processor locates the node containing the tainted object as the target node along each of the at least one tainted path from the sink to the source.

According to one of exemplary embodiments, the processor determines the type of the at least one vulnerability. The processor locates a first forward node containing the tainted object as the target node along each of the at least one tainted path from the source to the sink if the at least one vulnerability is one of the SQL injection, the OS command injection, the LDAP injection, the XML injection, or the XPath injection. Alternatively, the processor locates a first backward node containing the tainted object as the target node along each of the at least one tainted path from the sink to the source if the at least one vulnerability is not any of the SQL injection, the OS command injection, the LDAP injection, the XML injection, or the XPath injection. The processor further determines if an actual object/variable exists in the target node. The processor determines the at least one vulnerability is mitigable if the actual object/variable exists in the target node. The processor sets a next node as the target node if the object/actual variable does not exist in the target node.

According to one of exemplary embodiments, the processor applies an instant-fix call at the tainted object on the target node.

According to one of exemplary embodiments, the processor creates a copy of amended source code according to the instant-fix call and checks if the copy of amended source code is legal. The processor writes the target node into the database if the copy of amended source code is legal; the processor sets the next node as the target node if the copy of amended source code is not legal.

According to one of exemplary embodiments, the processor identifies at least one other tainted path with the same target node and determines if the same target node corresponds to different vulnerabilities. The processor removes the at least one other tainted path if the same target node does not correspond to different vulnerabilities; the processor evaluates a priority order of the vulnerabilities if the same target node corresponds to different tainted objects.

According to one of exemplary embodiments, the processor applies a plurality of instant-fix calls at the tainted object on the target node according to the priority order, checks a confidence score corresponding to the instant-fix call, and writes the target node into the database.

According to one of exemplary embodiments, the processor further lowers the confidence score if the tainted object includes certain known functions.

According to one of exemplary embodiments, the processor further determines if the at least one vulnerability is one of the SQL injection, the OS command injection, the LDAP injection, the XML injection, or the XPath injection. The processor may lower the confidence score if the at least one vulnerability is one of the SQL injection, the OS command injection, the LDAP injection, the XML injection, or the XPath injection and if the tainted object includes certain string constants.

According to one of exemplary embodiments, the processor further creates a copy of amended source code according to the instant-fix calls, compiles the copy of amended source code and determines if there exists any compiler error. The processor further locates the actual tainted object on the mitigable node corresponding to each of the compiler errors and sets the corresponding confidence score to zero.

An exemplary embodiment of the present invention provides a computer program product stored in a computer readable storage medium for automatically mitigating vulnerabilities in a source code of an application is provided in the present invention. The computer program including code for searching for at least one vulnerability within the source code, determining if the at least one vulnerability is mitigable, and mitigating the determined at least one vulnerability automatically.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
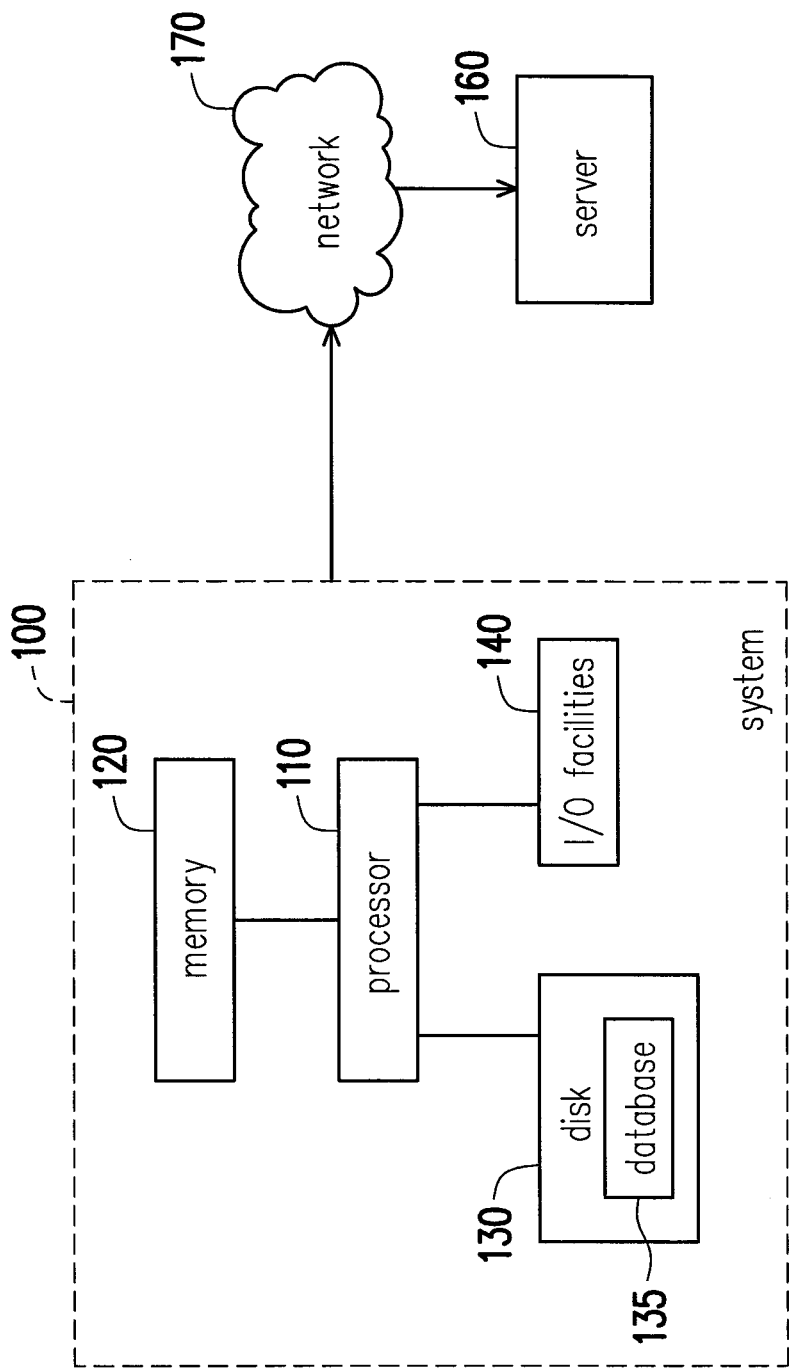
FIG. 1 is a system for automatically mitigating vulnerabilities in a source code according to an exemplary embodiment of the present invention.

Reference will now be made in detail to the present exemplary embodiments of the disclosure, examples of which are illustrated in the accompanying drawings. Wherever possible, the same reference numbers are used in the drawings and the description to refer to the same or like parts.

FIG. 1 is a system for automatically mitigating vulnerabilities in a source code according to an exemplary embodiment of the present invention.

Referring to FIG. 1, a system 100 may be a personal computer, an embedded computer, a smart phone, a laptop computer, a tabular computer or other devices capable of performing the functions described in the present invention. The system 100 includes a processor 110, a memory 120, a disk 130, and input/output (I/O) facilities 140. The processor 110 is coupled to the memory 120, the disk 130, and the I/O facilities. The processor 110 may be a single chip or a multiple processor unit and may include associated peripheral chips or functional blocks. The primary function of the processor 110 is to execute program instructions by performing operations on data. The memory 120 may be a volatile or non-volatile memory known to those skilled in the art including, for example, a random access memory (RAM), a static random access memory (SRAM), or a dynamic random access memory (RAM). The disk 130 may be a hard disk drive (HDD) or a solid state drive (SSD) and is configured for storing and retrieving files. For example, the disk 130 may include computer program products such as in the form of programming code, routines, or instruction blocks that provide a specific set or sets of ordered operations that control the functionality of the hardware and direct its operation to perform some features or functionality of the system 100 once the instructions are loaded into the memory 120 and executed by the processor 110. The disk 130 may also include a database 135, which may be implemented as any type of data storage structure capable of providing for the retrieval and storage of a variety of data types. The I/O facilities 140 may include an interface for a monitor, a keyboard, a joystick, a mouse, a pointing device, a speech-based interaction device or the like. Additionally, in another exemplary embodiment, the system 100 may further include other standard peripheral components (not shown).

In one of exemplary embodiments, the system 100 may be viewed as a client computer and connects to a server 160 via a network 170. The network 170 may be a computer network such as a local area network (LAN), wide area network (WAN), the Internet, or a cellular network. The server 160 may represent various forms of servers including, but not limited to a web server, an application server, or a network server. For example, the server 160 may be an application server that executes software accessed by the system 100. A user may invoke applications available on the server 160 in a web browser running on the system 100.

The application software hosted by the server 160 may exhibit various security vulnerabilities. For example, the application software may include vulnerable data and control flow patterns that enable hackers to force the software to perform unintended actions. An example of such problem is called a structured query language (SQL) injection, which occurs when untrusted data makes its way through an application and eventually becomes a part of an SQL query. The hackers may first identify the flow of untrusted data from its entry point, referred to as a "source," to a vulnerable Application Programming Interface (API), referred to as a "sink." For example, the source of a security vulnerability may be an injection of untrusted data in the parameter of a HyperText Transfer Protocol (HTTP) request, and the sink of a security vulnerability may be the process of data modification to manipulate the behavior of the application, such as a HyperText Markup Language (HTML) page. The hackers may manipulate the input data to change the meaning of the SQL query and cause significant harm to the repository resources such as a database system by simple assignments, method calls, or parameters passing. In other words, the hackers may inject an SQL statement into an existing SQL statement, causing the execution of the SQL statement, which is not expected by the application, to manipulate the database system in an unauthorized manner. Other known vulnerabilities, such as operating system (OS) command injection, lightweight directory access protocol (LDAP) injection, extensible markup language (XML) injection, XML path language (XPath) injection, cross-site scripting (XSS), weak cryptography, insecure redirect, error triggering sensitive information leak, session hijacking, security misconfiguration, and weak authentication, are also often exploited by hackers and would be apparent to one of ordinary skill in the art.

Figure 2:
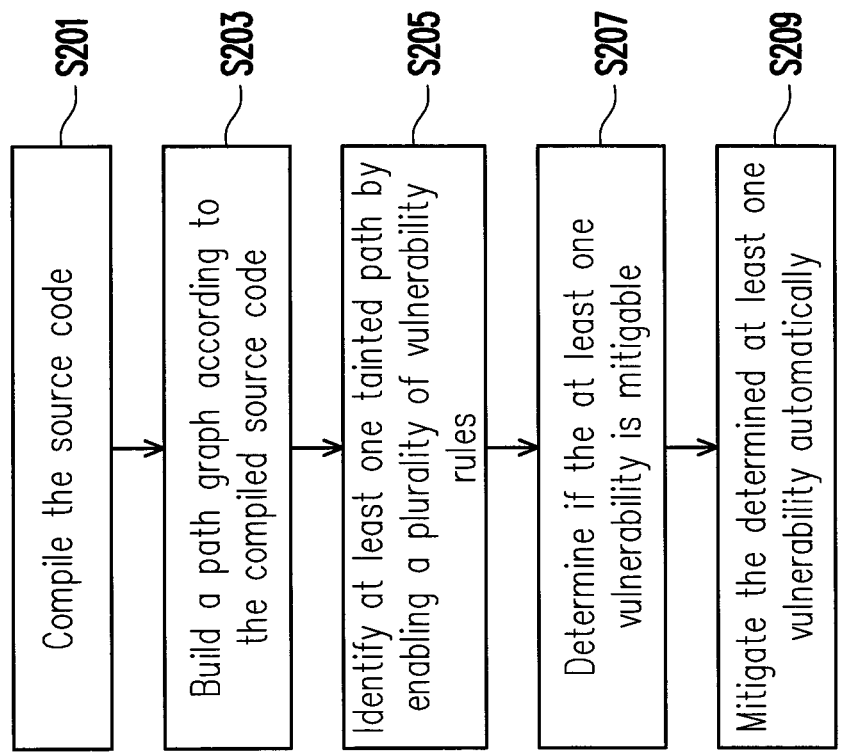
FIG. 2 is a flowchart illustrating a method for automatically mitigating vulnerabilities in source code according to an embodiment of the present invention.

FIG. 2 is a flowchart illustrating a method for automatically mitigating vulnerabilities in source code according to an embodiment of the present invention.

In the present embodiment, source code of an application may be any software code written in one or more programming languages including compiled languages such as C/C++, Java, Python, Perl, Ruby, PHP, Linux/UNIX shell script as well as interpreted languages such as assembly code, byte code, or instructions. Source code may be a fully functional program or a subset of a program such as a command, function, method, class, library, or any code segment. Source code may also reference outside classes, objects, files, libraries or APIs.

Referring to FIG. 2 along with the components in FIG. 1, the method for automatically mitigating vulnerabilities in source code including the following steps. First, the processor 110 compiles the source code (Step S201) and builds a path graph according to the compiled source code (Step S203). Next, the processor 110 searches for at least one vulnerability within the source code (Step S205). To be more specific, after the processor 110 obtains the source code of an application, it may compile the source code and builds a path graph according to the compiled source code. Such path graph includes a plurality of paths traversing from sources to sinks, and each of the paths includes a plurality of nodes. The path graph is used to determine those parts of the source code to which a particular value assigned to an object/variable might propagate. The processor 110 then identifies at least one tainted paths by enabling a plurality of vulnerability rules. The term "tainted" used herein refers to data that contains at least some data from an external source that is considered to be untrusted and propagates through, for example, some object/variable assignments to a destination. Therefore, each of the at least one tainted path corresponds to a vulnerability, and each of the at least one vulnerability corresponds to a sanitization method. The at least one tainted paths may be identified by using an existing automated data flow analysis tool to perform data flow analysis on the path graph. For example, theoretically, definite assignment analysis is one of data flow analysis used by C/C++ compilers to conservatively ensure that an object/variable is always assigned to before it is used. Java and C# programming language specifications require their compilers to report a compile-time error if the analysis fails. Also, the existing automated data flow analysis tool may be some open source or free tools such as RIPS (a static source code analyzer for vulnerabilities in PHP web applications), Google CodeSearchDiggity (a tool to identify SQL injections, XSS, hard-coded passwords, etc), or RATS (a tool for scanning C/C++, Perl, PHP, Python source code for vulnerabilities such as buffer overflows), and so on.

Next, the processor 110 determines if the at least one vulnerability is mitigable (Step S207). The at least one vulnerability may be associated with a node on a single tainted path or a node which is an intersection of multiple tainted paths. Therefore, the processor 110 may need to locate the exact position where the sanitization method may be placed so that the determined at least one vulnerability may be mitigated automatically in a precise manner (Step S209).

Figure 3:
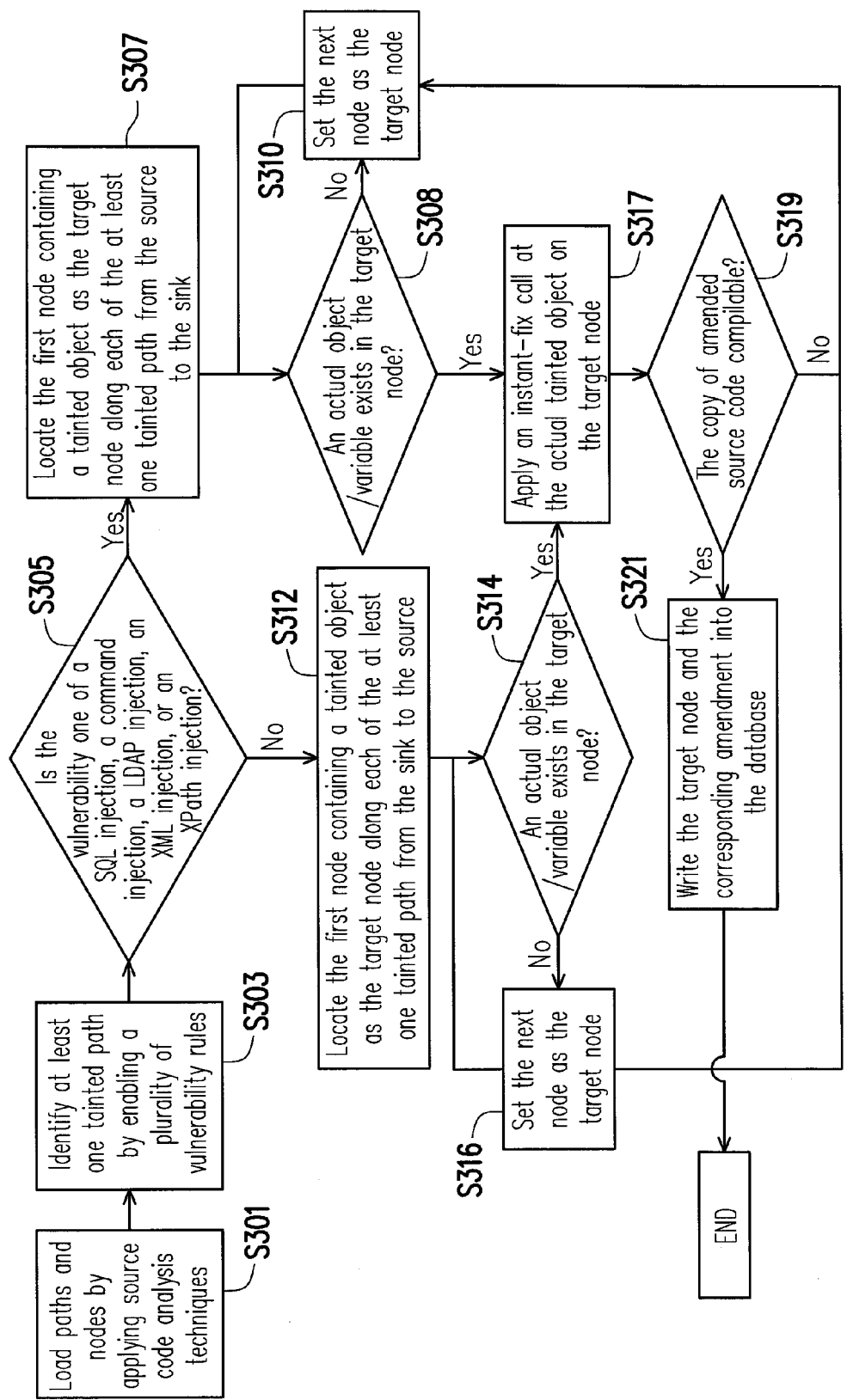
FIG. 3 is a flowchart illustrating an algorithm for automatically mitigating vulnerabilities in source code according to an embodiment of the present invention.

FIG. 3 is a flowchart illustrating an algorithm for automatically vulnerabilities in source code according to an embodiment of the present invention. In the present embodiment, it is assumed that each vulnerability is associated with a different mitigable node. In other words, each mitigable node is associated with a single tainted path.

Referring to FIG. 3 along with the components in FIG. 1, the processor 110 loads paths and nodes by applying source code analysis techniques such as definite assignment analysis on source code (Step S301) and identifies at least one tainted path by enabling a plurality of vulnerability rules through a complete scan of the source code (Step S303). Similar to the previous embodiment, Step S301 and S303 may be done by employing one of the existing automated data flow analysis tools mentioned in the previous embodiment. For each vulnerability, the processor 110 needs to find a suitable sanitization method that may be applied for each mitigable node, referred to as a "target node" hereinafter. Based on the type of the vulnerability, the processor 110 may conduct a forward traversal or a backward traversal on the at least one tainted path by following the tainted inputs of all computations encountered throughout the at least one tainted path.

To be more specific, the processor 110 determines if the vulnerability is one of a SQL injection, a OS command injection, a LDAP injection, an XML injection, or an XPath injection (Step S305). The OS command injection is an escape string or format string attack that occurs when unsanitized user input is passed to a system shell. The LDAP injection is an attack used to exploit web based applications that construct LDAP statements based on user input. The XML injection is a XML tag in a simple object access protocol (SOAP) message aiming at modifying the XML structure. Typical examples are modification of payment data and unauthorized administration login. The XPath injection is an attack when a website uses user-supplied information to construct an XPath query for XML data. Similar to the SQL injection, the hackers may exploit such vulnerability with a command sequence appended to the appropriate format or escape string to execute arbitrary commands. When a software application fails to properly sanitize user input, it is possible to modify commands or statements using a local proxy. A successful injection may result in the execution of arbitrary commands or restricted operations such as elevating the privileges, granting permission to unauthorized queries and content modification. If the vulnerability is determined to be one of the SQL injection, the OS command injection, the LDAP injection, the XML injection, or the XPath injection, the processor 110 locates the first node containing a tainted object (referred to as a first forward node) as the target node along each of the at least one tainted path from the source to the sink (Step S307). That is, among all the nodes containing the tainted inputs identified by the processor 110, the first forward node is tainted directly from a pure external source (injection) but not inherited from its parent node. On the other hand, if the vulnerability is determined to be other than the SQL injection, the OS command injection, the LDAP injection, the XML injection, or the XPath injection, the processor 110 locates the first node containing the tainted object (referred to as a first backward node) as the target node along each of the at least one tainted path from the sink to the source (Step S312).

After the target node is located, the processor 110 determines if the actual object/variable exists in the target node (Step S308 or Step S314). If the actual object/variable does not exist in the target node, the processor 110 sets a next node as the target node (Step S310 or Step S316) and repeats Step S308 or Step S314 respectively. That is, if the vulnerability is one of the SQL injection, the OS command injection, the LDAP injection, the XML injection, or the XPath injection, the processor 110 may locate the second node containing the tainted object as a new target node from the source to the sink (Step S310) for ensuring that the tainted object in the target node is not inherited from its parent node; otherwise, the processor 110 may locate the second node containing the tainted object as a new target node from the sink to the source (Step S316).

If the actual object/variable exists in the target node, the processor 110 determines that the current target node is mitigable and applies an instant-fix call at the actual tainted object on the target node based on the corresponding vulnerability rule (Step S317). The instant-fix call is configured to amend the injection code based on the provided vulnerability rule by using an existing vulnerability analysis tool in conjunction with the knowledge that the database 135 has accumulated over time in handling specific vulnerabilities in the past. In one of exemplary embodiments, the processor 110 may assign a confidence score (e.g. 0-3) for each instant-fix call as a future reference. Moreover, the processor 110 creates a copy of amended source code according to the instant-fix call.

Next, the processor 110 may compile the copy of amended source code and check if the copy of amended source code is compilable (Step S319). If the copy of amended source code is compilable, the processor 110 determines that the amendment is legal, writes the target node and the corresponding amendment into the database 135 for references in the future (Step S321), and ends the algorithm. If the copy of amended source code is not compilable, the processor 110 determines that the amendment is illegal and returns to Step S310 or Step S316 for another identification of a new target node until the mitigation is completed.

Figure 4:
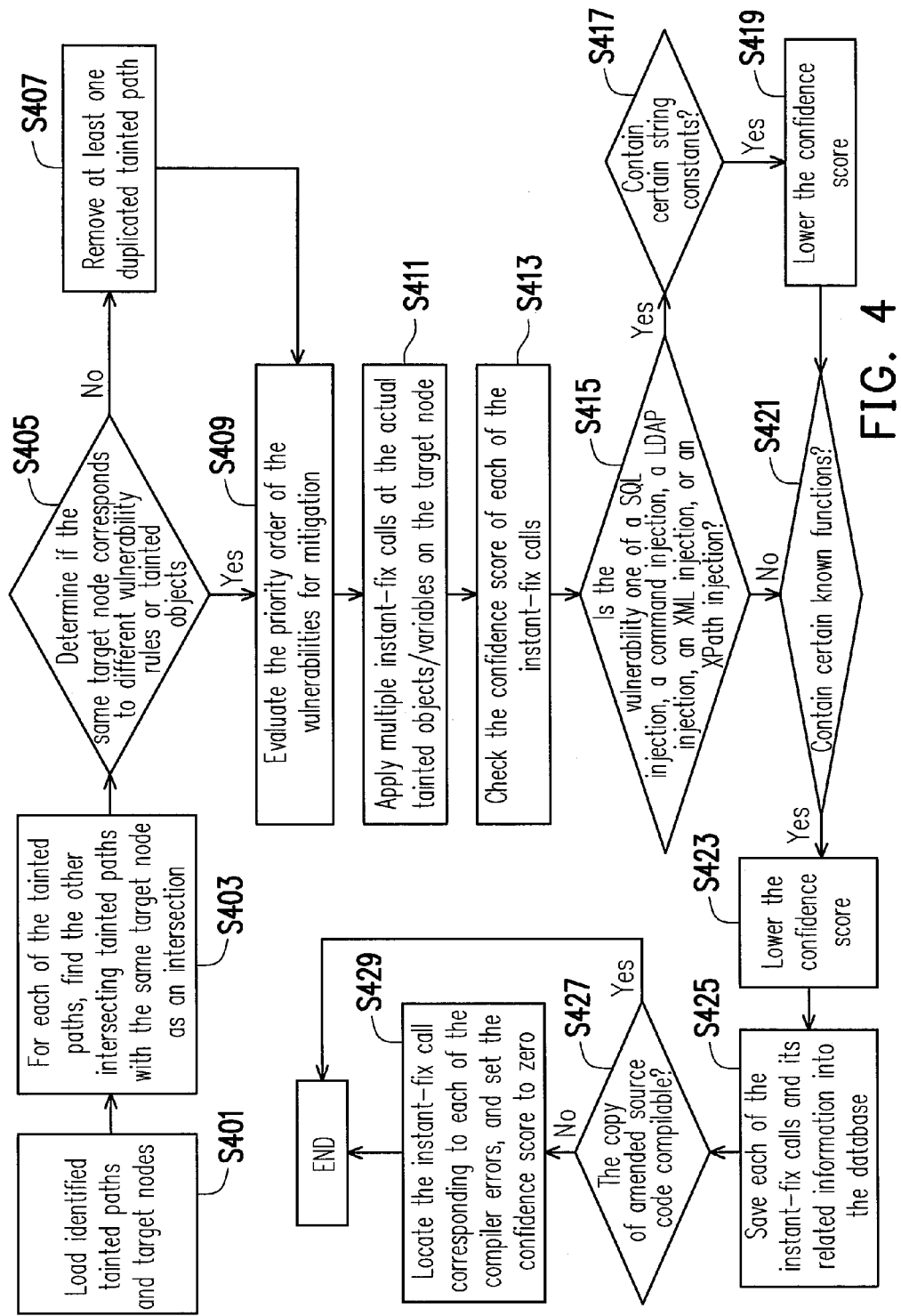
FIG. 4 is a flowchart illustrating an algorithm for automatically mitigating vulnerabilities in source code according to another embodiment of the present invention.

FIG. 4 is a flowchart illustrating an algorithm for automatically mitigating vulnerabilities in source code according to another embodiment of the present invention. In the present embodiment, it is assumed that more than one vulnerabilities are associated with a same mitigable node. In other words, each mitigable node is an intersection of multiple tainted paths.

Referring to FIG. 4, the processor 110 loads identified tainted paths and target nodes by enabling a plurality of vulnerability rules (Step S401). It is noted that such process may be done by leveraging the algorithm in FIG. 3, which will not be repeated hereinafter. For each of the tainted paths, the processor 110 may find the other intersecting tainted paths with the same target node as an intersection (Step S403). The processor 110 determines if the same target node corresponds to different vulnerability rules or tainted objects (Step S405). If the same target node corresponds to the same vulnerability rule or the same tainted object, the processor 110 may then remove at least one duplicated tainted path (Step S407). If the same target node corresponds to different vulnerability rules or different tainted objects, the processor may skip Step S407. For the same target node corresponds to different vulnerability rules or different tainted objects, the processor 110 may evaluate the priority order of the vulnerabilities for mitigation by the vulnerability rules (Step S409), which may define actual objects/variables on the target node and determine an optimal order to mitigate the vulnerability accordingly. Similar to Step S317, the processor 110 then may apply multiple instant-fix calls at the actual tainted objects/variables on the target node based on the corresponding vulnerability rule (Step S411).

Furthermore, the processor 110 may check the confidence score of each of the instant-fix calls (Step S413). In some embodiments, the processor 110 may choose not to apply the instant-fix calls with low confidence scores. The processor 110 may also adjust the confidence score at this point. First, the processor 110 determines if the vulnerability is one of the SQL injection, the OS command injection, the LDAP injection, the XML injection, or the XPath injection (Step S415). If the vulnerability is one of the SQL injection, the OS command injection, the LDAP injection, the XML injection, or the XPath injection, the processor 110 checks if the injection contains certain string constants (Step S417). If the injection contains certain string constants, the processor 110 may lower the confidence score of the corresponding instant-fix call (Step S419). If the vulnerability is not any one of the SQL injection, the OS command injection, the LDAP injection, the XML injection, or the XPath injection, the processor may skip Step S417 and directly proceeds to Step S421. In Step S421, the processor checks if the injection contains certain known functions. If the injection contains certain known functions, the processor 110 may lower the confidence score of the corresponding instant-fix call (Step S423) and save each of the instant-fix call and its related information into the database 135 (Step S425). It is noted that, if the injection does not contain certain known functions, the processor 110 may skip Step S423. Take the SQL injection as an example. The certain string constants may be concatenated with existing SQL commands, or the certain known functions may be meaningful SQL commands. As long as injected SQL code is syntactically correct, the processor 110 may not easily detect programmatically. Therefore, the processor 110 may need to validate the resulting instant-fix calls with a more careful review. In other words, the resulting instant-fix calls may be less reliable and receive lower confidence scores.

Next, the processor 110 may compile the copy of amended source code and check if the copy of amended source code is compilable (Step S427). If the copy of amended source code is compilable, the processor 110 determines that the amendment is legal and ends the algorithm. If the copy of amended source code is not compilable, the processor 110 locates the instant-fix call corresponding to each of the compiler errors, which means that the amendment is not reliable, sets the confidence score to zero (Step S429) and ends the algorithm. It is noted that, before the processor 110 applies the instant-fix call, it may first check the corresponding confidence score and make an adjustment based on the confidence score. In one of exemplary embodiments, such adjustment may be authenticated by the user manually.

By leveraging the algorithms presenting in the embodiments of FIG. 3 and FIG. 4, the system 100 in the present invention may automatically mitigate security issues in source code. In one of exemplary embodiments, when a user attempts to visit a website, the processor 110 of the system 100 may be initiated by one of the I/O facilities 140 such as a mouse click from the user, and first goes through the source code of the website. Then, the processor 110 finds the problems hackers may possibly exploit and then rewrite the source code to fix the problems. The user may then either verify and apply the fixes individually, or deploy the secured source code for immediate remediation.

In one of exemplary embodiments, computer program products including a plurality of program instructions stored in a tangible computer medium implementing the functionality or method of this invention will commonly be non-volatile, hard-coded type media distributed to users on a distribution medium, such as floppy disks, read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links, or other computer-readable medium. The term "computer-readable medium" encompasses distribution media, intermediate storage media, execution memory of a computer, and any other medium or device capable of storing computer program instructions implementing the functionality or methods of embodiments of the present invention for later reading by a computer system. The computer program will often be copied from the computer-readable medium to a hard disk or a similar intermediate storage medium. When the programs are to be run, they will be loaded either from their distribution medium or their intermediate storage medium into the execution memory of the computer, configuring the computer to act in accordance with the algorithm or method of this invention. All such operations are well known to those skilled in the art of computer systems.

In summary, by leveraging static code analysis and data flow graphs, the present invention provides a method, a system, and a computer program product for automatically mitigating vulnerabilities in a source code. By going through the source code of applications, the vulnerabilities that hackers may exploit are able to be found, and then the source code are re-written to mitigate the vulnerabilities. The users may then either verify and apply the amendment individually or deploy the secured source code for immediate remediation.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. A method for automatically mitigating vulnerabilities in a source code of an application comprising:
  compiling the source code;
  building a path graph according to the compiled source code, wherein the path graph comprises a plurality of paths traversing from sources to sinks, and wherein each of the paths comprises a plurality of nodes; and identifying at least one tainted path by enabling a plurality of vulnerability rules, wherein each of the at least one tainted path corresponds to a vulnerability, and each of the at least one vulnerability corresponds to a sanitization method;

determining if the at least one vulnerability is mitigable, comprising:

locating a first forward node containing a tainted object as a target node along each of the at least one tainted path from the source to the sink;

locating a first backward node containing the tainted object as the target node along each of the at least one tainted path from the sink to the source;

determining the type of the at least one vulnerability, wherein if the at least one vulnerability is one of a structured query language (SQL) injection, an operating system (OS) command injection, a lightweight directory access protocol (LDAP) injection, an extensible markup language (XML) injection, or an XML path language (XPath) injection, locating the node containing the tainted object as the target node along each of the at least one tainted path from the source to the sink, wherein if the at least one vulnerability is not any of the SQL injection, the OS command injection, the LDAP injection, the XML injection, or the XPath injection, locating the node containing the tainted object as the target node along each of the at least one tainted path from the sink to the source;

determining if an actual object/variable exists in the target node, wherein if the actual object/variable exits in the target node, determining that the at least one vulnerability is mitigable, wherein if the actual object/variable does not exist in the target node, setting a next node as the target node; and mitigating the at least one vulnerability determined to be mitigable automatically.

2. The method in claim 1, wherein said step of mitigating the at least one vulnerability determined to be mitigable automatically comprises:

applying an instant-fix call at the tainted object on the target node.

3. The method in claim 2, wherein after said step of applying the instant-fix call at the tainted object on the target node, the method further comprising:

creating a copy of amended source code according to the instant-fix call; and checking if the copy of amended source code is legal;

wherein if the copy of amended source code is legal, writing the target node into a database;

wherein if the copy of amended source code is not legal, setting the next node as the target node.

4. The method in claim 1, wherein said step of determining if the at least one vulnerability is mitigable further comprises:

identifying at least one other tainted path with the same target node; and determining if the same target node corresponds to different vulnerabilities;

wherein if the same target node does not correspond to different vulnerabilities, removing the at least one other tainted path;

wherein if the same target node corresponds to different vulnerabilities, evaluating a priority order of the vulnerabilities.

5. The method in claim 4, wherein said step of mitigating the at least one vulnerability determined to be mitigable automatically comprises:

applying a plurality of instant-fix calls at the tainted object on the target node according to the priority order;

checking a confidence score corresponding to each of the instant-fix calls; and writing the target node into a database.

6. The method in claim 5 further comprising:

lowering the confidence score if the tainted object comprises certain known functions.

7. The method in claim 6 further comprising:

determining if the at least one vulnerability is one of the SQL injection, the OS command injection, the LDAP injection, the XML injection, or the XPath injection;

wherein if the at least one vulnerability is one of the SQL injection, the OS command injection, the LDAP injection, the XML injection, or the XPath injection, lowering the confidence score if the tainted object comprises certain string constants.

8. The method in claim 4, wherein after said step of mitigating the at least one vulnerability determined to be mitigable automatically, the method further comprising:

creating a copy of amended source code according to the instant-fix calls;

compiling the copy of amended source code and determining if there exists any compiler error; and locating the actual tainted object on the mitigable node corresponding to each of the compiler errors and setting the corresponding confidence score to zero.

9. A system for automatically mitigating vulnerabilities in a source code of an application comprising:

a memory;

a database;

a processor coupled to the memory and the database, wherein the processor performs an operation for automatically mitigating vulnerabilities in the source code of the application, the operation comprising:

compiling the source code;

building a path graph according to the compiled source code, wherein the path graph comprises a plurality of paths traversing from sources to sinks, and wherein each of the paths comprises a plurality of nodes; and identifying at least one tainted path by enabling a plurality of vulnerability rules, wherein each of the at least one tainted path corresponds to a vulnerability, and each of the at least one vulnerability corresponds to a sanitization method;

determining if the at least one vulnerability is mitigable, comprising:

locating a first forward node containing a tainted object as a target node along each of the at least one tainted path from the source to the sink;

locating a first backward node containing the tainted object as the target node along each of the at least one tainted path from the sink to the source;

determining the type of the at least one vulnerability, wherein if the at least one vulnerability is one of a structured query language (SQL) injection, an operating system (OS) command injection, a lightweight directory access protocol (LDAP) injection, an extensible markup language (XML) injection, or an XML path language (XPath) injection, locating the node containing the tainted object as the target node along each of the at least one tainted path from the source to the sink, wherein if the at least one vulnerability is not any of the SOL injection, the OS command injection, the LDAP injection, the XML injection, or the XPath injection, locating the node containing the tainted object as the target node along each of the at least one tainted path from the sink to the source;

determining if an actual object/variable exists in the target node, wherein if the actual object/variable exits in the target node, determining that the at least one vulnerability is mitigable, wherein if the actual object/variable does not exist in the target node, setting a next node as the target node; and mitigating the at least one vulnerability determined to be mitigable automatically.

10. The system in claim 9, wherein the processor applies an instant-fix call at the tainted object on the target node.

11. The system in claim 10, wherein the processor creates a copy of amended source code according to the instant-fix call, checks if the copy of amended source code is legal, wherein the processor writes the target node into the database if the copy of amended source code is legal, and wherein the processor sets the next node as the target node if the copy of amended source code is not legal.

12. The system in claim 9, wherein the processor further identifies at least one other tainted path with the same target node and determines if the same target node corresponds to different vulnerabilities, wherein the processor removes the at least one other tainted path if the same target node does not correspond to different vulnerabilities, and wherein the processor evaluates a priority order of the vulnerabilities if the same target node corresponds to different tainted objects.

13. The system in claim 12, wherein the processor applies a plurality of instant-fix calls at the tainted object on the target node according to the priority order, checks a confidence score corresponding to each of the instant-fix calls, and writes the target node into the database.

14. The system in claim 13, wherein the processor further lowers the confidence score if the tainted object comprises certain known functions.

15. The system in claim 14, wherein the processor further determines if the at least one vulnerability is one of the SQL injection, the command injection, the LDAP injection, the XML injection, or the XPath injection, and lowers the confidence score if the at least one vulnerability is one of the SQL injection, the command injection, or the LDAP injection, the XML injection, or the XPath injection, and if the tainted object comprises certain string constants.

16. The system in claim 12, wherein the processor further creates a copy of amended source code according to the instant-fix calls, compiles the copy of amended source code and determines if there exists any compiler error, locates the actual tainted object on the mitigable node corresponding to each of the compiler errors, and sets the corresponding confidence score to zero.

17. A non-transitory computer readable medium comprising a plurality of program instructions, which when executed by a computer system, cause the computer system to execute the method according to claim 1.

* * * * *